US008016697B2

(12) United States Patent
Sullivan et al.

(10) Patent No.: US 8,016,697 B2
(45) Date of Patent: *Sep. 13, 2011

(54) MULTI-LAYER GOLF BALL

(75) Inventors: Michael J. Sullivan, Barrington, RI (US); Derek A. Ladd, Acushnet, MA (US); Edmund A. Hebert, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,172

(22) Filed: Nov. 16, 2010

(65) Prior Publication Data

US 2011/0059812 A1 Mar. 10, 2011

Related U.S. Application Data

(63) Continuation of application No. 12/606,796, filed on Oct. 27, 2009, which is a continuation of application No. 11/767,070, filed on Jun. 22, 2007, now abandoned, which is a continuation-in-part of application No. 10/773,906, filed on Feb. 6, 2004, now Pat. No. 7,255,656, which is a continuation-in-part of application No. 10/341,574, filed on Jan. 13, 2003, now Pat. No. 6,852,044, which is a continuation-in-part of application No. 10/002,641, filed on Nov. 28, 2001, now Pat. No. 6,547,677.

(51) Int. Cl.
*A63B 37/06* (2006.01)
(52) U.S. Cl. ........................................... 473/376
(58) Field of Classification Search .................. 473/376
See application file for complete search history.

(56) References Cited

U.S. PATENT DOCUMENTS

| | | | |
|---|---|---|---|
| 4,508,309 A | 4/1985 | Brown |
| 4,625,964 A | 12/1986 | Yamada |
| 4,714,253 A | 12/1987 | Nakahara et al. |
| 4,848,770 A | 7/1989 | Shama |
| 4,863,167 A | 9/1989 | Matsuki et al. |
| 5,048,126 A | 9/1991 | McLaughlin |
| 5,048,838 A | 9/1991 | Chikaraishi et al. |
| 5,104,126 A | 4/1992 | Gentiluomo |
| 5,184,828 A | 2/1993 | Kim et al. |
| 5,273,286 A | 12/1993 | Sun |
| 5,334,673 A | 8/1994 | Wu |
| 5,439,227 A | 8/1995 | Egashira et al. |

(Continued)

OTHER PUBLICATIONS

Farrally, M.R. et al., Science and Golf III: Proceedings of the World Scientific Congress of Golf; Illinois; Human Kinetics; copyright 1999, p. 411.

*Primary Examiner* — Raeann Trimiew
(74) *Attorney, Agent, or Firm* — Mandi B. Milbank

(57) ABSTRACT

Multi-layer golf balls having a relatively hard outer core surrounding a relatively soft, low compression inner core are provided. The inner core generally has a compression of less than 50 and the inner core and outer core generally have a combined dual core compression of 50 or greater. The outer core generally has a Shore C hardness of 80 or greater. A cover, which can be a single-, dual-, or multi-layer cover, is provided to surround the outer core. A moisture barrier layer is optionally provided between the outer core and the cover. The moisture vapor transmission rate of the moisture barrier layer is preferably less than the moisture vapor transmission rate of the cover.

11 Claims, 2 Drawing Sheets

U.S. PATENT DOCUMENTS

| | | |
|---|---|---|
| 5,482,285 A | 1/1996 | Yabuki et al. |
| 5,490,674 A | 2/1996 | Hamada et al. |
| 5,743,816 A * | 4/1998 | Ohsumi et al. ............... 473/376 |
| 5,772,531 A * | 6/1998 | Ohsumi et al. ............... 473/376 |
| 5,779,562 A | 7/1998 | Melvin et al. |
| 5,779,563 A | 7/1998 | Yamagishi et al. |
| 5,810,678 A | 9/1998 | Cavallaro et al. |
| 5,824,746 A | 10/1998 | Harris et al. |
| 5,908,358 A | 6/1999 | Wu |
| 5,919,100 A | 7/1999 | Boehm et al. |
| 5,929,189 A | 7/1999 | Ichikawa et al. |
| 5,947,842 A | 9/1999 | Cavallaro et al. |
| 5,971,870 A | 10/1999 | Sullivan et al. |
| 6,025,442 A | 2/2000 | Harris et al. |
| 6,056,842 A | 5/2000 | Dalton et al. |
| 6,117,024 A | 9/2000 | Dewanjee |
| 6,120,393 A | 9/2000 | Sullivan et al. |
| 6,124,389 A | 9/2000 | Cavallaro et al. |
| 6,142,887 A | 11/2000 | Sullivan et al. |
| 6,210,294 B1 | 4/2001 | Wu |
| 6,302,808 B1 | 10/2001 | Dalton et al. |
| 6,309,313 B1 | 10/2001 | Peter |
| 6,315,682 B1 | 11/2001 | Iwami et al. |
| 6,390,396 B1 | 5/2002 | Takano et al. |
| 6,390,935 B1 | 5/2002 | Sugimoto |
| 6,394,913 B1 | 5/2002 | Nesbitt et al. |
| 6,394,914 B1 | 5/2002 | Sullivan |
| 6,425,833 B1 | 7/2002 | Sullivan et al. |
| 6,547,677 B2 | 4/2003 | Sullivan et al. |
| 6,569,036 B1 | 5/2003 | Takemura et al. |
| 6,626,770 B2 | 9/2003 | Takemura et al. |
| 6,645,089 B2 | 11/2003 | Tsunoda et al. |
| 7,255,656 B2 | 8/2007 | Sullivan et al. |
| 7,833,113 B2 * | 11/2010 | Sullivan et al. ............... 473/376 |
| 2002/0019268 A1 | 2/2002 | Tsunoda |

* cited by examiner

MULTI-LAYER GOLF BALL

CROSS-REFERENCE TO RELATED APPLICATIONS

This application is a continuation of U.S. patent application Ser. No. 12/606,796, filed Oct. 27, 2009, which is a continuation of U.S. patent application Ser. No. 11/767,070, filed Jun. 22, 2007 now abandoned, which is a continuation-in-part of U.S. patent application Ser. No. 10/773,906, filed Feb. 6, 2004, now U.S. Pat. No. 7,255,656, which is a continuation-in-part of U.S. patent application Ser. No. 10/341,574, filed Jan. 13, 2003, now U.S. Pat. No. 6,852,044, which is a continuation-in-part of U.S. patent application Ser. No. 10/002,641, filed Nov. 28, 2001, now U.S. Pat. No. 6,547,677, the entire disclosures of which are hereby incorporated herein by reference.

FIELD OF THE INVENTION

The present invention generally relates to golf balls, and more particularly to golf balls having dual- and multi-layered cores having a relatively soft, low compression inner core surrounded by at least one relatively rigid outer core.

BACKGROUND OF THE INVENTION

Golf balls have conventionally been constructed as either two piece balls or three piece balls. The choice of construction between two and three piece affects the playing characteristics of the golf balls. The differences in playing characteristics resulting from these different types of constructions can be quite significant.

Three piece golf balls, which are also known as wound balls, are typically constructed from a liquid or solid center surrounded by tensioned elastomeric material. Wound balls are generally thought of as performance golf balls and have good resiliency, spin characteristics and feel when struck by a golf club. However, wound balls are generally difficult to manufacture when compared to solid golf balls.

Two piece balls, which are also known as solid core golf balls, include a single, solid core and a cover surrounding the core. The single solid core is typically constructed of a crosslinked rubber, which is encased by a cover material. For example, the solid core can be made of polybutadiene which is chemically crosslinked with zinc diacrylate or other comparable crosslinking agents. The cover protects the solid core and is typically a tough, cut-proof material such as SURLYN®, an ionomer resin commercially available from E. I. du Pont de Nemours and Company. This combination of solid core and cover materials provides a golf ball that is virtually indestructible by golfers. Materials used in these two piece golf balls may have a flexural modulus of greater than about 40,000 psi. In addition, this combination of solid core and cover produces a golf ball having a high initial velocity, which results in improved distance. Therefore, two piece golf balls are popular with recreational golfers because these balls provide high durability and maximum distance.

The stiffness and rigidity that provide the durability and improved distance, however, also produce a relatively low spin rate in these two piece golf balls. Low spin rates make golf balls difficult to control, especially on shorter shots such as approach shots to greens. Higher spin rates, although allowing a more skilled player to maximize control of the golf ball on the short approach shots, adversely affect driving distance for less skilled players. For example, slicing and hooking the ball are constant obstacles for the lower skill level players. Slicing and hooking result when an unintentional side spin is imparted on the ball as a result of not striking the ball squarely with the face of the golf club. In addition to limiting the distance that the golf ball will travel, unintentional side spin reduces a player's control over the ball. Lowering the spin rate of the golf ball reduces the adverse effects of unintentional side spin. Hence, recreational players typically prefer golf balls that exhibit low spin rate.

Various approaches have been taken to strike a balance between the spin rate and the playing characteristics of golf balls. For example, additional layers, such as intermediate core and cover layers are added to the solid core golf balls in an attempt to improve the playing characteristics of the ball. These multi-layer solid core balls include multi-layer core constructions, multi-layer cover constructions and combinations thereof. In a golf ball with a multi-layer core, the principal source of resiliency is the multi-layer core. In a golf ball with a multi-layer cover and single-layer core, the principal source of resiliency is the single-layer core.

In addition, varying the materials, density or specific gravity among the multiple layers of the golf ball controls the spin rate. In general, the total weight of a golf ball has to conform to weight limits set by the United States Golf Association ("USGA"). Although the total weight of the golf ball is controlled, the distribution of weight within the ball can vary. Redistributing the weight or mass of the golf ball either toward the center of the ball or toward the outer surface of the ball changes the dynamic characteristics of the ball at impact and in flight. Specifically, if the density is shifted or redistributed toward the center of the ball, the moment of inertia of the golf ball is reduced, and the initial spin rate of the ball as it leaves the golf club increases as a result of the higher resistance from the golf ball's moment of inertia. Conversely, if the density is shifted or redistributed toward the outer surface of the ball, the moment of inertia is increased, and the initial spin rate of the ball as it leaves the golf club would decrease as a result of the higher resistance from the golf ball's moment of inertia.

The redistribution of weight within the golf ball is typically accomplished by adding fillers to one or more of the core or cover layers of the golf ball. Conventional fillers include high specific gravity fillers, such as metal or metal alloy powders, metal oxide, metal searates, particulates, and carbonaceous materials and low specific gravity fillers, such as hollow spheres, microspheres and foamed particles. However, the addition of fillers may adversely interfere with the resiliency of the polymers used in golf balls and thereby the coefficient of restitution of the golf balls.

There remains a need in the industry for golf balls having a desirable spin profile. The present invention provides such golf balls through the use of novel golf ball designs which include dual- and multi-layer cores and relatively soft covers.

SUMMARY OF THE INVENTION

In one embodiment, the present invention provides a golf ball comprising an inner core layer, a first outer core layer, a second outer core layer, an inner cover layer, and an outer cover layer, wherein the difference between the hardness of the second outer core layer and the center hardness of the inner core layer is from 20 Shore C units to 45 Shore C units. The inner core layer has a compression of less than 50, a diameter of 1.00 inch or greater, a center hardness of from 40 Shore C to 75 Shore C, a surface hardness of from 45 Shore C to 78 Shore C, and a specific gravity of 1.11 or greater. The first outer core layer has a thickness of from 0.01 inches to 0.1 inches. The second outer core layer has a thickness of from 0.01 inches to 0.1 inches, a hardness of 80 Shore C or greater, and a specific gravity less than or equal to the specific gravity of the inner core layer. The inner cover layer is formed from a partially or fully neutralized ionomer composition and has a thickness of from 0.015 inches to 0.100 inches. The outer cover layer is formed from a composition selected from polyurethanes, polyureas, and blends and copolymers thereof, and has a thickness of from 0.010 inches to 0.080 inches.

BRIEF DESCRIPTION OF THE DRAWINGS

In the accompanying drawing which forms a part of the specification and is to be read in conjunction therewith and in which like reference numerals are used to indicate like parts in the various views.

DETAILED DESCRIPTION

Figure 2:
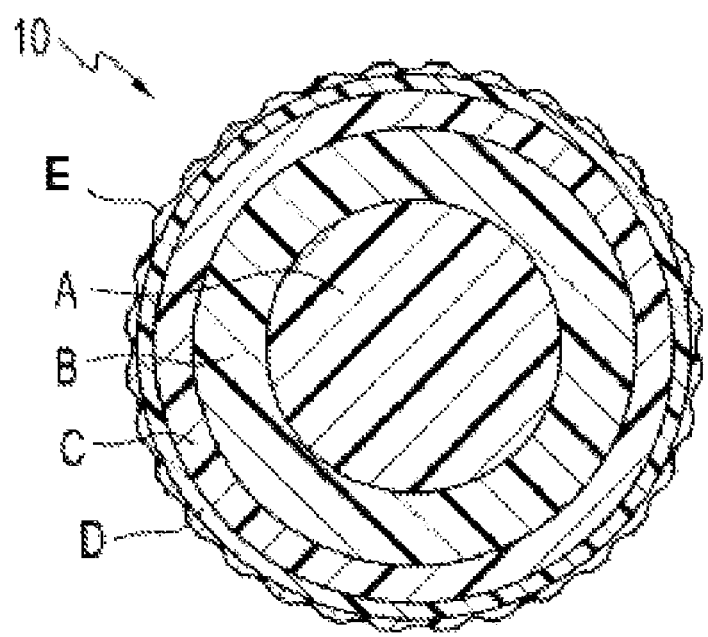
FIG. 2 is a cross-sectional representation of a golf ball formed in accordance with another embodiment of the present invention.

FIG. 2 shows a golf ball 10 according to one embodiment of the present invention, including an inner core layer A, a first outer core layer B, a second outer core layer C, an inner cover layer D, and an outer cover layer E.

The present invention is directed to an improved golf ball displaying the desired spin profile and having a generally rigid, thermoset polybutadiene outer core surrounding a relatively soft, low compression inner core. Preferably, this golf ball has an inner core having a compression of less than about 50 and at least one outer core layer surrounding the inner core and having a Shore C hardness of 80 or greater and a specific gravity of 1.1 or greater. The inner core has a hardness less than the hardness of the outer core. In a particular embodiment, the inner core has a specific gravity less than or equal to the outer core specific gravity. In a particular aspect of this embodiment, the inner core has a specific gravity of less than 1.13, or less than 1.1, or a specific gravity of from 0.90 to 1.13 or from 1.00 to 1.10; and the outer core has a specific gravity of 1.11 or greater, or 1.13 or greater, or greater than 1.25, or a specific gravity of from 1.11 to 5.00 or from 1.24 to 2.00. In another particular embodiment, the inner core has a specific gravity greater than or equal to the outer core specific gravity. In a particular aspect of this embodiment, the inner core preferably has a specific gravity of $\geq 1.20$, or $>1.20$, or $\geq 1.50$, or $>1.50$, or $\geq 1.75$, or $>1.75$, or $\geq 2.00$, or $>2.00$, or $\geq 5.00$, or $>5.00$, and the outer core has a specific gravity of $\leq 1.2$, or $<1.2$, or $\leq 1.15$, or $<1.15$, or $\leq 1.05$, or $<1.05$.

The inner core includes a polybutadiene rubber, zinc diacrylate ("ZDA"), an organic peroxide and zinc oxide. In one embodiment, the inner core is made from about 100 pph of the polybutadiene rubber, about 34 pph of the zinc diacrylate, about 0.53 pph of the organic peroxide and a sufficient amount of the zinc oxide to produce the inner core specific gravity. The outer core includes a polybutadiene rubber, a stiffening agent, zinc diacrylate, an organic peroxide, zinc oxide and barytes filler, and in one embodiment is made from about 100 pph of the polybutadiene rubber, about 8 pph of the stiffening agent, about 0.66 pph of the organic peroxide, about 5 pph of the zinc oxide and about 35 pph of the zinc diacrylate. Suitable stiffening agents include balata and trans polyisoprene. (Include formulations from Inv Rec?)

Overall the inner core and outer core are formulated to provide a combined overall core compression of greater than about 50, or greater than about 70. In a particular embodiment, the inner core and outer core have a combined dual core compression of from about 50 to about 80, or from about 60 to about 80, or a compression of about 72. In another particular embodiment, the inner core and outer core have a combined dual core compression of from about 70 to about 100, or from about 75 to about 95, or a compression of about 85. In yet another particular embodiment, the inner core and outer core have a combined dual core compression of from about 80 to about 100.

In one embodiment, the inner core has a diameter of from about 1.4 inches to about 1.5 inches, the outer core has a thickness of from about 0.05 inches up to about 0.1 inches, and the inner core and outer core have a combined overall core diameter of greater than about 1.58 inches, preferably greater than about 1.60 inches. In another embodiment, the inner core has a diameter within a range having a lower limit of about 0.50 or about 0.70 or about 0.80 or about 0.90 or about 1.00 inches and an upper limit of about 1.10 or about 1.20 or about 1.25 or about 1.30 inches, or the inner core has a diameter of about 1.00 inches; the outer core has a thickness within a range having a lower limit of about 0.10 or about 0.20 or about 0.27 inches and an upper limit of about 0.29 or about 0.30 or about 0.35 or about 0.40 or about 0.57 inches; and the inner core and outer core have a combined overall core diameter of from about 1.50 inches to about 1.60 inches, preferably from about 1.54 inches to about 1.59 inches, more preferably from about 1.55 inches to about 1.58 inches, and even more preferably about 1.55 inches or about 1.58 inches.

A cover having one or more layers is provided to surround and to cover the outer core layer. The cover generally has an overall thickness of about 0.02 inches or greater and is preferably constructed of polyurea, polyurethane, or an ionomeric composition.

The golf ball can also include a moisture barrier layer disposed between the outer core layer and the cover layer. The moisture vapor barrier protects the inner and outer cores from degradation due to exposure to moisture, for example water, and extends the usable life of the golf ball. The moisture vapor transmission rate of the moisture barrier layer is selected to be less than the moisture vapor transmission rate of the cover layer. The moisture barrier layer has a specific gravity of from about 1.1 to about 1.2 and a thickness of less than about 0.03 inches. Suitable materials for the moisture barrier layer include a combination of a styrene block copolymer and a flaked metal, for example aluminum flake.

Figure 1:
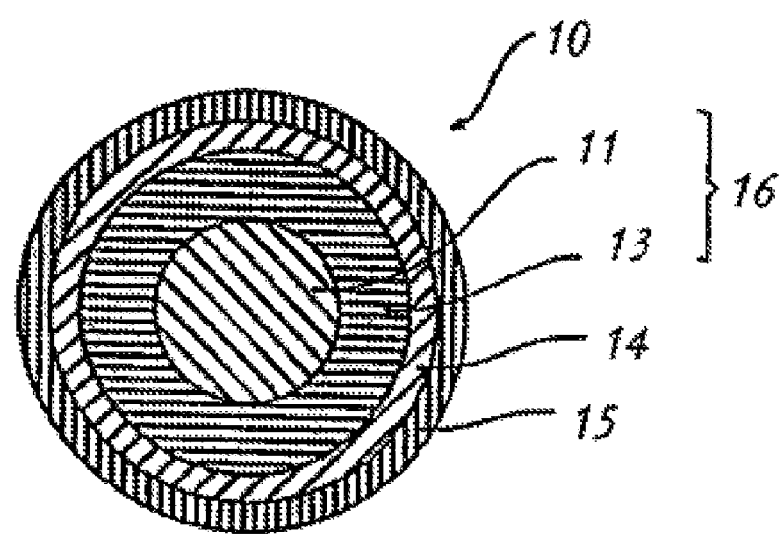
FIG. 1 is a cross-sectional representation of a golf ball formed in accordance with an embodiment of the present invention.

Referring now to FIG. 1, golf ball 10 in accordance with the present invention is constructed to provide the desired spin profile and playing characteristics. In an embodiment as illustrated, golf ball 10 includes core 16 and cover layer 15 surrounding core 16. In one embodiment, the diameter of core 16 is greater than about 1.58 inches. In another embodiment, the diameter of core 16 is greater than about 1.6 inches. In another embodiment, the diameter of core 16 is from about 1.53 inches to about 1.60 inches, or from about 1.54 inches to about 1.59 inches. In another embodiment, the diameter of core 16 is about 1.55 inches. In yet another embodiment, the diameter of core 16 is about 1.58 inches.

The compression of core 16 is generally about 50 or greater. In one embodiment, the overall compression of core 16 is greater than about 50, or greater than about 70. In another embodiment, the overall compression of core 16 is from about 80 to about 100. In another embodiment, the overall compression of core 16 is from about 60 to about 80, or from about 50 to about 80. In another embodiment, the overall compression of core 16 is about 72. In another embodiment, the overall compression of core 16 is from about 70 to about 100, or from about 75 to about 95. In yet another embodiment, the overall compression of core 16 is about 85.

As used herein, compression is measured by applying a spring-loaded force to the golf ball or golf ball component to be examined with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch against this spring. If the spring, in turn, compresses 0.2 inch, the compression is rated at 100. If the spring compresses 0.1 inch, the compression value is rated as 0. Thus more compressible, softer materials will have lower Atti gauge values than harder, less compressible materials. Compression measured with this instrument is also referred to as PGA compression.

Core 16 includes inner core 11 and at least one outer core layer 13 surrounding inner core 11. Although illustrated as a dual layer core having a single outer core layer 13, other embodiments in accordance with the present invention can have two, three or more outer core layers. In one embodiment, an additional core layer (not shown) is provided surrounding outer core 13. This additional core layer can have a thickness of from about 0.005 inches to about 0.01 inches. In one embodiment, the specific gravity of the additional core layer is greater than about 5.

In general, inner core 11 is constructed as a relatively soft, low compression core. In one embodiment, inner core 11 includes a base rubber, a cross linking agent, an initiator and a filler. The base rubber typically includes natural or synthetic rubbers. A preferred base rubber is a polybutadiene rubber. Examples of suitable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; CARIFLEX® BCP820 and CARIFLEX® BCP824, commercially available from Shell of Houston, Tex. and BR 1200, commercially available from The Dow Chemical Company of Midland, Mich. If desired, the polybutadiene can also be mixed with one or more additional elastomers that are known in the art such as natural rubber, polyisoprene rubber and styrene-butadiene rubber in order to modify the properties of inner core 11. In one embodiment, the base rubber is present in an amount of about 100 parts per hundred ("pph").

Suitable cross linking agents include metal salts, such as a zinc salt or a magnesium unsaturated fatty acid, such as acrylic or methacrylic acid, having 3 to 8 carbon atoms. Examples include, but are not limited to, metal salt diacrylates, dimethacrylates, and monomethacrylates, wherein the metal is magnesium, calcium, zinc, aluminum, sodium, lithium, or nickel. Suitable acrylates include zinc acrylate, zinc diacrylate, zinc methacrylate, zinc dimethacrylate, and mixtures thereof. Preferably, the cross linking agent is zinc diacrylate. In one embodiment, the zinc diacrylate is provided as zinc diacrylate pellets having an 80% zinc diacrylate content. The cross linking agent is typically present in an amount greater than about 10 pph of the base rubber, preferably from about 15 to about 40 pph of the base rubber, more preferably from about 20 to about 35 pph of the base rubber. In one embodiment, the cross linking agent is present in an amount greater than about 25 pph. In another embodiment, the cross linking agent is present in an amount of about 34 pph.

The initiator agent can be any known polymerization initiator that decomposes during the cure cycle. Suitable initiators include organic peroxide compounds, for example dicumyl peroxide; 1,1-di(t-butylperoxy) 3,3,5-trimethyl cyclohexane; α,α-bis(t-butylperoxy) diisopropylbenzene; 2,5-dimethyl-2,5 di(t-butylperoxy) hexane; di-t-butyl peroxide; and mixtures thereof. Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J. A preferred organic peroxide initiator is Trigonox®, commercially available from Akzo Nobel Polymer Chemicals by of Amersfoort, Netherlands. Suitable initiator levels include initial concentrations of from about 0.1 to about 3.0 pph, preferably from about 0.2 to about 2.0 pph, and more preferably from about 0.3 to about 1.5 pph. In one embodiment, the initiator is present in an amount of greater than 0.5 pph. In another embodiment, the initiator level is about 0.53 pph.

Fillers added to one or more portions of the golf ball typically include processing aids or compounds to affect rheological and mixing properties, density-modifying fillers, tear strength modifiers, reinforcement fillers, and the like. The fillers are generally inorganic, and suitable fillers include numerous metals or metal oxides, such as zinc oxide and tin oxide, as well as barium sulfate, barytes, zinc sulfate, calcium carbonate, barium carbonate, clay, tungsten, tungsten carbide, an array of silicas, and mixtures thereof. Fillers may also include various foaming agents or blowing agents that may be readily selected by one of ordinary skill in the art. Fillers can include polymeric, ceramic, metal, and glass microspheres and can be solid or hollow, and filled or unfilled. Fillers are typically also added to one or more portions of the golf ball to modify the density thereof to conform to uniform golf ball standards. Preferably, inner core 11 contains zinc oxide as the filler. The filler is present in an amount sufficient to produce the desired specific gravity in inner core 11. In one embodiment, inner core 11 can include unfilled or foamed density reducing material to reduce the specific gravity of the inner core 11, increasing the moment of inertia of golf ball 10. In another embodiment, inner core 11 can include a specific gravity increasing filler, fiber, flake or particulate to increase the specific gravity of the inner core 11, decreasing the moment of inertia of golf ball 10.

The constituents and constituent concentrations of inner core 11 are selected to produce the desired physical characteristics. Inner core 11 is selected to have a compression of less than about 70, or less than about 65, or less than about 50, or about 50 or less, or about 40 or less, or about 30 or less, or about 25 or less, or about 20 or less, or about 15 or less, or about 10 or less, or the compression is about 10 or about 20.

The hardness of inner core 11 is selected to be less than the hardness of outer core 13. In one embodiment, the hardness of inner core 11 is from about 70 to about 80 Shore C. In another embodiment, the hardness of inner core 11 is less than about 80 Shore C, for example about 78 Shore C. In another embodiment, the Shore C hardness of inner core 11 is $\leqq 78$, or $<78$, or $\leqq 70$, or $<70$, or $\leqq 65$, or $<65$, or $\leqq 60$, or $<60$, or the Shore C hardness is within a range having a lower limit of about 50 or about 55 and an upper limit of about 60 or about 63 or about 65. In yet another embodiment, the Shore C hardness of inner core 11 is about 63.

In one embodiment, inner core 11 has a specific gravity of less than about 1.13, for example from about 1 to about 1.1 or about 1.05. In another embodiment, inner core 11 has a specific gravity of less than about 1.11. In another embodiment, inner core 11 has a specific gravity of from about 0.90 to about 1.13. In another embodiment, inner core 11 has a specific gravity within a range having a lower limit of about 0.90 or about 1.10 or about 1.11 and an upper limit of about 1.13 or about 1.15 or about 1.16. In another embodiment, inner core 11 has a specific gravity of about 1.15. In yet another embodiment, inner core 11 has a specific gravity of about 1.11.

In one embodiment, the coefficient of restitution of inner core 11 is from about 0.8 to about 0.825, preferably about 0.812. In another embodiment, the coefficient of restitution of inner core 11 is from about 0.740 to about 0.799. In another embodiment, the coefficient of restitution of inner core 11 is from about 0.750 to about 0.780. In yet another embodiment, the coefficient of restitution of inner core 11 is about 0.745 or about 0.775. As used herein, the term "coefficient of restitution" ("COR") for golf balls is defined as the ratio of the rebound velocity to the inbound velocity when balls are fired into a rigid plate. A discussion of COR and suitable test methods for measuring COR can be found, for example, in U.S. Pat. No. 6,547,677 B2, which is incorporated herein by reference. In one embodiment, inner core 11 is constructed to have a diameter of at least about 1 inch, or a diameter of from about 1.4 inches to about 1.5 inches. In another one embodiment, the diameter of inner core 11 is about 1.457 inches. In another embodiment, the diameter of inner core 11 is about 1.00 inches, or is within a range having a lower limit of about 0.50 or about 0.70 or about 0.80 or about 0.90 or about 1.00 inches and an upper limit of about 1.10 or about 1.20 or about 1.25 or about 1.30 inches.

In an alternative embodiment, inner core 11 is a liquid or hollow core.

Outer core 13 surrounds inner core 11 and is constructed to be more rigid than inner core 11. In one embodiment, outer core 13 includes a base rubber, a cross linking agent, an initiator, one or more fillers and, alternatively, a stiffening agent. Suitable base rubbers, cross linking agents, initiators and fillers are the same as those for inner core 11. In one embodiment the base rubber is a thermoset polybutadiene. The base rubber is present in an amount of about 100 pph. Zinc diacrylate is a preferred cross linking agent. In one embodiment, the cross linking agent is present in an amount of greater than 35 pph. In another embodiment, the amount of cross linking agent is greater than about 40 pph. In yet another embodiment, the cross linking agent is present in an amount of about 53 pph. Preferably, the initiator is an organic peroxide. In one embodiment, the organic peroxide is present in an amount greater than about 0.6 pph. In another embodiment, the organic peroxide is present in an amount of about 0.66 pph. A preferred filler is zinc oxide. In another embodiment, the filler also includes barytes. Fillers are added in an amount sufficient to impart the desired weight and physical characteristics, for example specific gravity, to outer core 13. In one embodiment, the filler can be present in an amount of about 5 pph.

Suitable stiffening agents to be used in outer core 13 include balata and trans polyisoprene. Preferably, the stiffening agent is balata. These stiffening agents are commercially available under the tradenames TP251 and TP301. The stiffening agents are added to outer core 13 in an amount of from about 5 pph to about 10 pph. In one embodiment, the stiffening agent is present in an amount of about 8 pph.

As with inner core 11, the constituents and constituent concentrations of outer core 13 are selected to produce the desired physical characteristics. In one embodiment, outer core 13 has a compression of about 90. In another embodiment the compressions of the inner and outer cores are selected to provide a combined dual core compression of greater than about 50, or greater than about 70. In another embodiment, the inner and outer cores are selected to provide a combined dual core compression of from about 80 up to about 100. In another embodiment, inner core 11 and outer core 13 have a combined dual core compression of from about 60 to about 80, or from about 50 to about 80. In another embodiment, inner core 11 and outer core 13 have a combined dual core compression of about 72. In another embodiment, inner core 11 and outer core 13 have a combined dual core compression of from about 70 to about 100, or from about 75 to about 95. In yet another embodiment, inner core 11 and outer core 13 have a combined dual core compression of about 85.

The hardness of outer core 13 is generally selected to be greater than or equal to about 80 Shore C. In one embodiment, the hardness is greater than or equal to about 90 Shore C. In another embodiment, outer core 13 has a Shore C hardness of about 85 or greater. In another embodiment, outer core 13 has a Shore C hardness of about 80 or greater. In another embodiment, outer core 13 has a Shore C hardness of about 85. In yet another embodiment, outer core 13 has a Shore C hardness of about 89.

In one embodiment, the flex modulus (per ASTM D-790) of outer core 13 is greater than about 30,000 psi.

In one embodiment, outer core 13 has a specific gravity that is greater than or equal to the specific gravity of inner core 11. In another embodiment, outer core 13 has a specific gravity that is less than or equal to the specific gravity of inner core 11. In another embodiment, the specific gravity of outer core 13 is about 1.10 or greater. In another embodiment, the specific gravity of outer core 13 is about 1.11 or greater. In another embodiment, the specific gravity of outer core 13 is about 1.13 or greater. In another embodiment, the specific gravity of outer core 13 is about 1.24. In another embodiment, the specific gravity of outer core 13 is greater than about 1.25. In another embodiment, the specific gravity of outer core 13 is from about 1.11 to about 5.00. In another embodiment, the specific gravity of outer core 13 is from about 1.24 to about 2.00. In yet another embodiment, the specific gravity of outer core 13 is about 1.14. Having the specific gravity of outer core 13 greater than the specific gravity of inner core 11 increases the moment of inertia and lowers the spin rate of golf ball 10. Having the specific gravity of outer core 13 less than the specific gravity of inner core 11 decreases the moment of inertia and raises the spin rate of golf ball 10.

In one embodiment, the coefficient of restitution of outer core 13 is about 0.824. In another embodiment, the coefficient of restitution of the inner and outer core are selected to produce a combined dual core coefficient of restitution of from about 0.805 to about 0.83. In another embodiment, the coefficient of restitution of the inner and outer core are selected to produce a combined dual core coefficient of restitution within a range having a lower limit of about 0.785 or about 0.790 and an upper limit of about 0.795 or about 0.800 or about 0.805 or about 0.810.

Outer core 13 generally has a thickness of from about 0.05 inches to about 0.6 inches. In one embodiment, outer core 13 has a thickness of from about 0.05 inches up to about 0.1 inches. In another embodiment, outer core 13 has a thickness of about 0.075 inches. In another embodiment, outer core 13 has a thickness of from about 0.20 inches to about 0.57 inches, or from about 0.20 inches to about 0.35 inches. In another embodiment, outer core 13 has a thickness within a range having a lower limit of about 0.05 or about 0.10 or about 0.20 or about 0.25 or about 0.27 inches and an upper limit of about 0.29 or about 0.30 or about 0.35 or about 0.40 or about 0.57 inches. In yet another embodiment, outer core 13 has a thickness of about 0.275 inches or about 0.290 inches.

In general, the diameter of inner core 11 and thickness of outer core 13 are selected to produce a diameter for core 16 that is about 1.00 inch or greater. In one embodiment, the diameter of core 16 is greater than about 1.58 inches, preferably greater than about 1.6 inches. In another embodiment, the diameter of core 16 is within a range having a lower limit of about 1.00 or about 1.10 or about 1.30 or about 1.50 or about 1.53 or about 1.54 or about 1.55 inches and an upper limit of about 1.58 or about 1.59 or about 1.60 inches. In another embodiment, the diameter of core 16 is about 1.55 inches. In yet another embodiment, the diameter of core 16 is about 1.58 inches.

When golf ball 10 includes multiple outer core layers, each outer core layer can include the same materials as disclosed above for the inner core 11 and outer core 13, or different compositions. In one embodiment, at least one outer core layer is substantially stiffer and harder than inner core 11. In one embodiment, each one of the outer cores has a thickness of from about 0.001 inches to about 0.1 inches, preferably from about 0.01 inches to about 0.05 inches.

Cover layer 15 surrounds outer core 13. Cover layer 15 can include any materials known to those of ordinary skill in the art, including thermoplastic and thermosetting materials, but preferably the cover layer can include any suitable materials, such as:

(1) Polyurethanes, such as those prepared from polyols and diisocyanates or polyisocyanates and those disclosed in U.S. Pat. Nos. 5,334,673, 6,506,851, 6,867,279, and 6,960,630, the entire disclosures of which are hereby incorporated herein by reference;

(2) Polyureas, such as those disclosed in U.S. Pat. Nos. 5,484,870 and 6,835,794, and U.S. Patent Application Ser. No. 60/401,047, the entire disclosures of which are hereby incorporated herein by reference;

(3) Polyurethane-urea hybrids, blends or copolymers comprising urethane or urea segments; and (4) Ionomeric compositions, including partially and highly neutralized polymer compositions, such as those disclosed in U.S. Pat. Nos. 6,653,382, 6,756,436, 6,894,098, 6,919,393, and 6,953,820, the entire disclosures of which are hereby incorporated herein by reference.

Polyurethane and polyurea outer cover layer materials can be thermoset or thermoplastic. Thermoset materials can be formed into golf ball layers by conventional casting or reaction injection molding techniques. Thermoplastic materials can be formed into golf ball layers by conventional compression or injection molding techniques. Light stable, castable polyureas and polyurethanes are preferred outer cover layer materials.

In one embodiment, cover layer 15 includes a layer formed from a castable polyurethane or castable polyurea composition, wherein the layer preferably has a Shore D hardness of from about 45 to about 60, or a Shore D hardness of about 65 or less, or a Shore D hardness of less than about 65, or a Shore D hardness of about 60 or less, or a Shore D hardness of less than about 60, or a Shore D hardness of about 58, or a Shore C hardness of about 83.

In another embodiment, cover layer 15 preferably includes a polyurethane composition comprising the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, i.e., as part of a prepolymer and in the curing agent. The polyurethane composition may be used in forming the inner cover, outer cover, or both. In one preferred embodiment, the outer cover includes the polyurethane composition.

In another embodiment, the curing agent includes a polyol curing agent. In a particular aspect of this embodiment, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; trimethylol propane, or mixtures thereof.

In one embodiment, the polyurethane composition includes at least one isocyanate and at least one curing agent. In another embodiment, the polyurethane composition includes at least one isocyanate, at least one polyol, and at least one curing agent. In a preferred embodiment, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. In another preferred embodiment, the at least one polyol includes a polyether polyol, hydroxy-terminated polybutadiene, polyester polyol, polycaprolactone polyol, polycarbonate polyol, or mixtures thereof. In yet another preferred embodiment, the curing agent includes a polyamine curing agent, a polyol curing agent, or a mixture thereof. In a more preferred embodiment, the curing agent includes a polyamine curing agent. In a most preferred embodiment, the polyamine curing agent includes 3,5-dimethylthio-2,4-toluenediamine, or an isomer thereof; 3,5-diethyltoluene-2,4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); or mixtures thereof.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("$H_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4, 4-trimethyl-1,6-hexane diisocyanate ("TMDI"), tetracene diisocyanate, naphthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 8.5% NCO, more preferably from about 2.5% to about 8.0%, even more preferably from about 4.0% to about 7.2%, and most preferably from about 5.0% to about 6.5%.

Any polyol available to one of ordinary skill in the art is suitable for use according to the invention. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyl-diamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

At least one of a diol, triol, tetraol, or hydroxy-terminated curative may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(4-hydroxyethyl) ether; hydroquinone-di-(4-hydroxyethyl) ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof.

Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

In some embodiments, cover layer 15 includes a layer formed from a partially or fully neutralized ionomer composition, wherein the layer preferably has a Shore D hardness of 65 or less, or a Shore D hardness of less than 65, or a Shore D hardness of from 50 to 65, or a Shore D hardness of from 57 to 60, or a Shore D hardness of 58. Preferred ionomers include, but are not limited to, those selected from copolymers of a $C_3$ to $C_8$ α,β-ethylenically unsaturated mono- or dicarboxylic acid and ethylene or a $C_3$ to $C_6$ α-olefin, optionally including a softening monomer. The ionomer is optionally highly neutralized (i.e., at least 70%, or at least 90%, or at least 100%, of the acid moieties thereof are neutralized). Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference. Commercially available ionomeric materials suitable for use cover layers of the present invention include, but are not limited to, Surlyn® ionomer resins and DuPont® HPF 1000 and HPF 2000, commercially available from E. I. du Pont de Nemours and Company; and Iotek® ionomers, commercially available from ExxonMobil Chemical Company. Also suitable are blends of ionomers with thermoplastic elastomers.

In one embodiment, the thickness of cover layer 15 is from about 0.03 inches up to about 0.04 inches. In another embodiment, the thickness of cover layer 15 is from about 0.02 inches to about 0.05 inches. In another embodiment, the thickness of cover layer 15 is within a range having a lower limit of about 0.01 or about 0.02 inches and an upper limit of about 0.100 or about 0.090 or about 0.055 or about 0.040 inches. In yet another embodiment, the thickness of cover layer 15 is about 0.035 inches.

In another embodiment, cover layer 15 has a thickness of from about 0.02 inches to about 0.05 inches. In a particular aspect of this embodiment, cover layer 15 includes a layer formed from a castable polyurethane or castable polyurea composition. In another particular aspect of this embodiment, cover layer 15 includes a layer formed from a castable polyurethane or castable polyurea composition and has a Shore D hardness of less than about 65 or a Shore D hardness of less than about 60 or a Shore D hardness of from about 45 to about 60. In another particular aspect of this embodiment, cover layer 15 includes a layer formed from a partially or fully neutralized ionomer composition. In yet another particular aspect of this embodiment, cover layer 15 includes a layer formed from a partially or fully neutralized ionomer composition and has a Shore D hardness of less than about 65 or a Shore D hardness of less than about 60 or a Shore D hardness within a range having a lower limit of about 50 or about 57 and an upper limit of about 60 or about 65.

Although illustrated as having a single cover layer, golf ball 10 can have two or more cover layers to fine tune the spin and feel of golf ball 10. Thus, in another embodiment, cover layer 15 comprises an inner cover layer and an outer cover layer. In a particular aspect of this embodiment, the inner cover layer is formed from a partially or fully neutralized ionomer composition, and preferably has a thickness of from about 0.015 inches to about 0.100 inches or from about 0.20 inches to about 0.50 inches, and more preferably has a thickness of about 0.035 inches. The inner cover layer preferably has a Shore D hardness of from about 60 to about 80, more preferably from about 65 to about 75, and most preferably from about 66 to about 69. In another particular aspect of this embodiment, the outer cover layer preferably has a Shore D hardness of ≦65 or <65 or ≦60 or <60, is formed from a castable polyurethane or polyurea composition, and preferably has a thickness of from about 0.015 to about 0.040 inches, or a thickness of from about 0.030 inches to about 0.040 inches, or a thickness of from about 0.20 inches to about 0.35 inches.

In one embodiment, golf ball 10 also includes moisture barrier layer 14 disposed between outer core 13 and cover layer 14. In one embodiment, moisture barrier layer 14 comprises at least one of the plurality of outer core layers. In another embodiment, moisture barrier layer 14 is a separate layer independent of the plurality of outer core layers. Moisture barrier layer 14 is selected to maintain the playing characteristics and initial velocity of golf ball 10 as the golf ball ages. In one embodiment, moisture barrier layer 14 is selected to have a moisture vapor transmission rate that is less than a moisture vapor transmission rate of cover layer 15. This inhibits moisture from entering into inner core 11 and outer core 13 and adversely affecting the properties of those layers.

In general, moisture barrier layer 14 has a moisture vapor transmission rate that is lower than that of the cover layer 15, and more preferably less than the moisture vapor transmission rate of an ionomer resin, which is in the range of about 0.45 to about 0.95 gram-mm/m$^2$-day. The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

In a particular embodiment, moisture barrier layer 14 includes a styrene block co-polymer. Suitable styrene block co-polymers are available under the tradename Kraton® from Kraton Polymers of Houston, Tex. In addition, moisture vapor barrier layer 14 also has micro particles disposed therein. These particles are preferably hydrophobic and create a more tortuous path across moisture vapor barrier layer 14 to reduce the moisture transmission rate of layer 14. The micro particles may include nano particles, ceramic particles, flaked glass, and flaked metals (e.g., micaceous materials, iron oxide or aluminum). In one embodiment, moisture barrier layer 14 includes aluminum flake.

The constituents, formulations and thickness of moisture barrier layer 14 are selected to provide the desired moisture transmission rate. In one embodiment, moisture barrier layer 14 has a specific gravity of from about 1 to about 2. In another embodiment, moisture barrier layer 14 has a specific gravity of about 1.13. The thickness of moisture barrier layer 14 is less than about 0.03 inches. In one embodiment, the thickness of moisture barrier layer 14 is about 0.024 inches.

Preferred materials and constructions for moisture barrier layer 14 are further disclosed, for example, in U.S. Pat. Nos. 6,632,147, 6,838,028, 6,932,720, 7,004,854 and 7,182,702, and U.S. Patent Application Publication Nos. 2003/0069082, 2003/0069085, 2003/0130062, 2004/0147344, 2004/0185963, 2006/0068938, 2006/0128505 and 2007/0129172, the entire disclosures of which are hereby incorporated herein by reference.

As previously mentioned, golf balls of the present invention have a single or multi-layer cover. When a relatively soft cover layer is desired, the material used to form the layer is preferably selected from polyurethanes, polyureas, hybrid polyurethane-polyurea copolymers, partially- or fully-neutralized ionomeric copolymers and terpolymers, and blends of ionomers with polar group functionalized polyolefins. When a polar group functionalized polyolefin is used, a preferred material is a maleic anhydride-modified metallocene-catalyzed polyolefin, such as those disclosed in U.S. Pat. No. 5,703,166, the entire disclosure of which is hereby incorporated herein by reference. In some embodiments, golf ball of the present invention have a cover layer having a Shore D hardness of 65 or less, or 60 or less, or a Shore D hardness of from 20 to 65, or from 30 to 65. In an alternative embodiment, the present invention provides golf balls having an inner core, an outer core layer, a cover, and an optional moisture barrier layer, wherein the cover preferably has a Shore D hardness of 65 or greater, or a Shore D hardness of from 65 to 80, or from 66 to 78, or from 68 to 75, and wherein the cover is preferably formed from a material selected from high acid ionomer-comprising compositions, rigid polyurethanes, rigid polyureas, and blends and copolymers thereof. In another alternative embodiment, the present invention provides golf balls having an inner core, an outer core layer, and a cover, wherein the outer core layer functions as a moisture barrier layer having a moisture vapor transmission rate less than that of the cover. Such an outer core layer may comprise a polybutadiene rubber, a highly filled polybutadiene rubber (e.g., a polybutadiene rubber containing flake- or sheet-like particles as disclosed in the moisture barrier layer references given above) to provide a "tortuous path" barrier, a polybutadiene rubber having low or no ZDA (i.e., from 0 to 20 phr, preferably from 0 to 15 phr, more preferably 0-10 phr), a trans polyisoprene, a trans polybutadiene rubber, an ethylene-propylene rubber ("EPR"), an ethylene-propylene-diene monomer rubber ("EPDM"), or other diene rubber that provides a low rate of moisture transmission.

Inner and outer core layers of any embodiment disclosed herein may have a hardness gradient, i.e., a difference in hardness from the center of the inner core to the surface of the inner core and likewise from the innermost surface of the outer core layer to the surface of the outer core layer. The gradient may be positive (increasing), negative (decreasing), or neutral. When a positive gradient is used, the center of the inner core is the softest point and preferably has a hardness of from about 40 to about 75 Shore C; the surface of the inner core preferably has a hardness of from about 45 to about 78 Shore C; and the outer core layer preferably has a hardness of about 80 Shore C or greater or from about 80 to about 95 Shore C. The magnitude of the gradient is calculated as the hardness of the outer core layer surface minus the center of the inner core and may be from about 5 to about 45 Shore C, or from about 20 to about 45 Shore C, or from about 25 to about 45 Shore C, and is preferably from about 8 to about 40 Shore C, or from about 15 to about 35 Shore C, or from about 18 to about 30 Shore C. The surface hardness of a core is measured once on each pole. The two measurements are averaged. To measure the center hardness, a core is pressed into a cavity that is approximately 0.010-0.020 inches smaller than the core such that the core bottoms out in the cavity and fits securely. A rough cut of the exposed half is made slightly off center using a band saw or other appropriate cutting tool. The measurement surface is finished to a smooth surface on a surface grinder such that the surface passes through the center of the core and is parallel to the base of the cavity. The center is located with a center square, marked and the hardness measurement is taken with the core remaining in the cavity. Optionally, other spots can be located and measured to map out the gradient profile. The hardness difference is calculated as the average surface hardness–center hardness.

In some embodiments, the arrangements and formulations of golf ball 10 can be summarized according to Table 1 below.

TABLE 1

| Property | Inner Core | Outer core Layer | Multi-Layer Core | Moisture Barrier Layer | Cover Layer |
|---|---|---|---|---|---|
| Hardness (surface) | <outer core layer; <80 Shore C; about 78 Shore C; <70; <60; <50; <40; <30; <20 | >80 Shore C; >90 Shore C; ≧55 Shore D; 55-80 Shore D; 60-75 Shore D; 63-72 Shore D | — | * | <65 Shore D; <60 Shore D; 20-65 Shore D; 30-60 Shore D; 35, 40, 45, 50, or 55 Shore D; 65-80 Shore D; 66-78 Shore D; 68-75 Shore D |
| Compression | <70; <65; <50; 10-70; 20-60; 25-45; 30-40 | 80-100; 90; 60-105; 70-100 | >50; >70; 80-100; 50-115 | * | — |
| Specific Gravity | 1-1.1; 1.05; <1.13; 0.90-1.13; >specific gravity of outer core; >1.2; >1.5; >1.75; >2; >5 | >specific gravity of inner core; >1.1; 1.24; 1.25; 1.50; 2.00; 5.00; 10.00; 1.15; 1.75; <specific gravity of inner core; <1.2; <1.5; <1.75; <2; <5 | — | * | 0.95-1.30; 1.00-1.20; 1.05-1.15 |
| Diameter | 1.4"-1.5"; 1.457"; 1.0"-1.62"; 0.5"-1.62"; 0.6; 0.7; 0.8; 0.9 | ** | >1.58"; 1.6" >1.6"; 1.52"-1.66"; 1.62; 1.64 | * | (diameter of ball) 1.680-1.800; 1.680-1.720; 1.680-1.690; 1.680-1.685 |
| Thickness | — | 0.05"-0.1"; 0.075" ** | — | * | 0.03"-0.04"; 0.035"; 0.010"-0.055" 0.020; 0.080; 0.010-0.080 |
| COR | 0.8-0.825; 0.812; 0.725-0.825; 0.750-0.820; 0.775-0.815 | 0.824; 0.8-0.825; 0.815 | 0.805-0.83 | * | 0.800-0.850; 0.801-0.830; 0.805-0.825 |
| MATERIAL | | | | | |
| CB23 | 100 pph | 100 pph | — | — | — |
| TP301 | — | 8 pph | — | — | — |
| Zinc Diacrylate | >25 pph; 34 pph | >35 pph; >40 pph; 53 pph | — | — | — |
| Trigonox ® | >0.5 pph; 0.53 pph | >0.6 pph; 0.66 pph | — | — | — |
| Filler/Zinc Oxide | Sufficient to produce s.g. | Sufficient to produce s.g.; 5 pph | — | — | — |

TABLE 1-continued

| Property | Inner Core | Outer core Layer | Multi-Layer Core | Moisture Barrier Layer | Cover Layer |
|---|---|---|---|---|---|
| Barytes Filler | — | To weight | — | — | — |
| Kraton FG | — | — | — | Per Formulation | — |
| Aluminum Flake | — | — | — | Per Formulation | — |
| Polyurea/Polyurethane | — | — | — | — | Per Formulation |

\* Properties, materials and constructions for the moisture barrier layer are further disclosed in U.S. Pat. Nos. 6,632,147, 6,838,028, 6,932,720, 7,004,854 and 7,182,702, and U.S. Patent Application Publication Nos. 2003/0069082, 2003/0069085, 2003/0130062, 2004/0147344, 2004/0185963, 2006/0068938, 2006/0128505 and 2007/0129172, the entire disclosures of which have been incorporated herein by reference.
\*\* See Table 2.

Table 2 below gives the diameter and thickness of various golf ball layers according to embodiments of the present invention wherein the golf ball has an overall diameter of 1.68 inches and does not include an optional moisture barrier layer. It should be understood that if a moisture barrier layer is to be included, one or more of the layers in Table 2 should be modified, i.e., reduced in diameter or thickness.

TABLE 2

| Inner Core Diameter (inches) | Outer Core Thickness (inches) | Multi-Layer Core Diameter (inches) | Cover Thickness (inches) |
|---|---|---|---|
| 0.50 | 0.570 | 1.64 | 0.020 |
| 1.00 | 0.320 | 1.64 | 0.020 |
| 1.25 | 0.195 | 1.64 | 0.020 |
| 1.40 | 0.120 | 1.64 | 0.020 |
| 1.50 | 0.070 | 1.64 | 0.020 |
| 1.62 | 0.010 | 1.64 | 0.020 |
| 1.00 | 0.310 | 1.62 | 0.030 |
| 1.00 | 0.300 | 1.60 | 0.040 |
| 1.25 | 0.175 | 1.60 | 0.040 |
| 1.50 | 0.050 | 1.60 | 0.040 |
| 1.00 | 0.260 | 1.52 | 0.080 |
| 1.50 | 0.010 | 1.52 | 0.080 |

Golf ball 10 can be constructed by any known method that is generally known and available in the art. Suitable methods include methods for formulating and mixing the constituents of the various layers of golf ball 10. These methods also include methods for forming golf ball 10 including compression molding, injection molding, casting, and reaction injection molding. Examples of these methods can be found, for example, in U.S. Pat. Nos. 6,547,677 and 6,852,044, the entire disclosures of which are hereby incorporated herein by reference.

When injection molding is used, the HNP composition is typically in a pelletized or granulated form that can be easily fed into the throat of an injection molding machine wherein it is melted and conveyed via a screw in a heated barrel at temperatures of from 150° F. to 600° F., preferably from 200° F. to 500° F. The molten HNP composition is ultimately injected into a closed mold cavity, which may be cooled, at ambient or at an elevated temperature, but typically the mold is cooled to a temperature of from 50° F. to 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

When compression molding is used to form a center, the HNP composition is first formed into a preform or slug of material, typically in a cylindrical or roughly spherical shape at a weight slightly greater than the desired weight of the molded core. Prior to this step, the HNP composition may be first extruded or otherwise melted and forced through a die after which it is cut into a cylindrical preform. It is that preform that is then placed into a compression mold cavity and compressed at a mold temperature of from 150° F. to 400° F., preferably from 250° F. to 350° F., and more preferably from 260° F. to 295° F. When compression molding a core or cover layer of an HNP composition, a half-shell is first formed via injection molding and then a core comprising one or more layers is enclosed within two half shells and then compression molded in a similar manner to the process previously described.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claim is:

1. A golf ball comprising:
   an inner core layer having a compression of less than 50, a diameter of 1.00 inch or greater, a center hardness of from 40 Shore C to 75 Shore C, a surface hardness of from 45 Shore C to 78 Shore C, and a specific gravity of 1.11 or greater;
   a first outer core layer having a thickness of from 0.01 inches to 0.1 inches;
   a second outer core layer having a thickness of from 0.01 inches to 0.1 inches, a hardness of 80 Shore C or greater, and a specific gravity less than or equal to the specific gravity of the inner core layer;
   an inner cover layer formed from a partially or fully neutralized ionomer composition and having a thickness of from 0.015 inches to 0.100 inches; and
   an outer cover layer formed from a composition selected from polyurethanes, polyureas, and blends and copolymers thereof, and having a thickness of from 0.010 inches to 0.080 inches;
   wherein the difference between the hardness of the second outer core layer and the center hardness of the inner core layer is from 20 Shore C units to 45 Shore C units.

2. The golf ball of claim 1, wherein the diameter of the inner core layer is from 1.00 inch to 1.30 inches.

3. The golf ball of claim 1, wherein the specific gravity of the inner core layer is 1.20 or greater.

4. The golf ball of claim 1, wherein the second outer core layer has a flex modulus of greater than 30,000 psi.

5. The golf ball of claim 1, wherein the compression of the inner core layer is 40 or less.

6. The golf ball of claim 1, wherein the difference between the hardness of the second outer core layer and the center hardness of the inner core layer is from 25 Shore C units to 45 Shore C units.

7. The golf ball of claim 1, wherein the inner cover layer has a Shore D hardness of from 60 to 80.

8. The golf ball of claim 1, wherein the inner cover layer has a Shore D hardness of from 65 to 75.

9. The golf ball of claim 1, wherein the outer cover layer has a Shore D hardness of 60 or less.

10. The golf ball of claim 1, wherein the outer cover layer has a Shore D hardness of less than 60.

11. The golf ball of claim 1, wherein the thickness of the outer cover layer is from 0.020 inches to 0.055 inches.

* * * * *